United States Patent [19]

Konno et al.

[11] Patent Number: 5,327,229

[45] Date of Patent: Jul. 5, 1994

[54] DISPLAY DEVICE

[75] Inventors: Toshio Konno, Hoya; Shintaro Nakagaki, Miura; Ichiro Negishi; Tetsuji Suzuki, both of Yokosuka; Fujiko Tatsumi, Yokohama; Ryusaku Takahashi, Yokosuka; Hiroyuki Bonde, Yokohama; Tsutomu Matsumura, Yokosuka, all of Japan

[73] Assignee: Victor Company of Japan, Ltd., Yokohama, Japan

[21] Appl. No.: 16,732

[22] Filed: Feb. 11, 1993

[30] Foreign Application Priority Data

Feb. 13, 1992 [JP] Japan .................................. 4-058862

[51] Int. Cl.⁵ ............................................. H04N 9/30
[52] U.S. Cl. ...................................... 348/742; 359/48; 359/64; 359/40; 348/743; 348/751
[58] Field of Search ....................... 358/59, 58, 56, 57, 358/60, 61, 62, 63, 64, 230, 232, 236, 233, 234; 359/40, 41, 70, 71, 72, 73, 48, 84, 85, 92, 91, 64; H04N 9/30

[56] References Cited

U.S. PATENT DOCUMENTS

| | | | |
|---|---|---|---|
| 4,090,219 | 5/1978 | Ernstoff et al. | 358/58 |
| 4,124,545 | 6/1992 | Takanashi et al. | 359/72 |
| 4,786,146 | 11/1988 | Ledebuhr | 356/60 |
| 4,907,862 | 3/1990 | Sumtola | 359/48 |
| 5,009,490 | 4/1991 | Kouno et al. | 359/48 |
| 5,111,315 | 5/1992 | Ledebuhr | 359/40 |

FOREIGN PATENT DOCUMENTS 0250425 10/1987 Japan ..................................... 358/60

Primary Examiner—James J. Groody
Assistant Examiner—Michael Lee
Attorney, Agent, or Firm—Michael N. Meller

[57] ABSTRACT

A clear color image having a high contrast ratio without particular coloration is displayed on a screen by improved display apparatus. Such display apparatus is comprised of a spatial light modulator including a photo-conductive layer, a photo-modulator layer and a dielectric mirror, a device for writing color images of different colors onto the spatial light modulator time-divisionally in a sequence of the different colors, a reading device for producing reading lights having different colors in synchronism with time-divisional writing of the color images, and for projecting the reading lights to the spatial light modulator, a driving device for supplying the spatial light modulator with different voltages and frequencies correspondingly with the reading light of different colors and in synchronism with time-divisional projections of the reading lights, and a device for projecting the color images read out from the spatial light modulator on the display device.

The dielectric mirror may have a light absorbance characteristic controlled to be wavelength-selective to absorb a color of light to which the photo-conductive layer is most sensitive, so that lights having different colors leaked into the photo-conductive layer through the dielectric mirror are controlled to cause a uniform impedance of the photo-conductive layer.

5 Claims, 5 Drawing Sheets

DISPLAY DEVICE

BACKGROUND OF THE INVENTION

1. Field of the Invention

The present invention relates to a display device for displaying a color image.

2. Description of the Related Art

A projector system disclosed in Japanese Laid Open Patent Application 1-502139 (1989) is shown in FIG. 1 schematically as an example of a conventional display device which will be described in the following.

FIG. 1 shows a construction of an example of a conventional display device.

Referring to FIG. 1, after a white light beam emitted from a light source 15 is directed to an R, G and B switching device (referred to as RGB switching device) 14, R, G and B components of the white light beam are output sequentially to a main prism 11 by causing the polarizing angles of the R, G and B components to be switched at high speed by the RGB switching device 14.

The RGB switching device 14 is constituted with a polarizing prism 1 for polarizing an input white light beam to a white light beam having a predetermined polarized light (P-polarized light), a blue filter 2 for reflecting a blue light component of the output white light from the polarizing prism 1 and passing other light components, a red filter 3 for reflecting only a red light component of the light components passed through the blue filter 2, a green filter 4 for reflecting a green light passed through the blue filter 2 and the red filter 3. Each of the liquid crystal polarizer switches 5, 6 and 7, when it is off, rotates polarizing angle of the incident light component reflected from the respective filters 2, 3 and 4 by 90 degrees and allows to pass it, but these polarization rotated light components pass through subsequently and correspondingly provided blue, red and green filters 8, 9 and 10, thus are not used as reading lights. When each of the liquid crystal polarizer switches 5, 6 and 7 is on, the turned on switch allows to pass the incident light as it is (polarization of the incident light is not rotated). Blue, red and green filters 8, 9 and 10 functions similarly to the filters 2, 3 and 4 respectively. Light reflected by the respective filters 8, 9 and 10 are supplied to the main prism 11. By switching the liquid crystal polarizing switches 5, 6 and 7 of the RGB switching device 14 sequentially, the main prism 11 supplies to a light valve 12 only the color light the polarization of which is not rotated by the turned on polarizing switch 5, 6 or 7.

The light valve 12 is referred to as spatial light modulator (SLM) and has a construction shown in FIG. 6.

FIG. 6 is a sectional view showing a construction of exemplary spatial light modulator.

Referring to FIG. 6, the spatial light modulator 20 has a laminated structure of a glass substrate 21, a transparent electrode (ITO) 22, a photo-conductive layer 23, a dielectric mirror 24, a photo-modulator layer 25 (utilizing birefringence effect of, for example, TN liquid crystal or perpendicularly oriented liquid crystal, etc.), a transparent electrode 26 and a glass substrate 27, in the order. The photo-modulator layer 25 is sandwiched between aligning films 28 and 29.

In writing an image, a voltage is applied across the transparent electrodes 22 and 26 to generate an electric field across the photo-conductive layer 23, and a writing light (image light) is directed to the photo-conductive layer through the glass substrate 21 and the transparent electrode 22. Upon receiving the writing light electric resistance or impedance of the photo-conductive layer 23 varies correspondingly with a sectional intensity distribution of the writing light.

In reading the image, a reading light is directed to the photo-modulator layer 25 through the glass substrate 27 and the transparent electrode 26. The reading light which passes twice the photo-modulator layer 25 being reflected by the dielectric mirror 24 is modulated correspondingly with a state of the writing light, thus read out through the glass substrate 27.

In this case, when the R, G and B lights sequentially supplied from the RGB switching device 14 through the main prism 11 and an image output on a screen of a CRT 13 are supplied to the light valve 12 which is the spatial light modulator 20 as the reading light and the writing light respectively, the image on the screen of the CRT 13 is observable as a color image through the main prism 11 as follows. By sequentially outputting (reading) R, G and B images from the screen of the CRT 13 in synchronism with time divisional and sequential supplies of R, G and B reading lights through the liquid crystal polarizing switches 5, 6 and 7 which are switched at high speed, an observer sees the respectively colored images as a normal color image.

Although a white light is a composition of R, G, B lights, the respective light amounts of the R, G and B components are different from each other and the respective wavelength thereof are also different from each other. Therefore, when the R, G and B reading light beams are supplied in time-divisionally and sequentially to the light valve 12, the light amount and the wavelength spectrum of the reading light vary time to time.

Further, although the dielectric mirror 24 of the light valve 12 (spatial light modulator 20) can reflect the reading light whose wavelength is in a range from 400 to 700 nm, it can not reflect 100% of the incident light, therefore, leakage of the light penetrating into the photo-conductive layer 23 is always present although the amount thereof is very small. Due to such leakage light, an impedance of the photo-conductive layer 23 is affected accordingly, which causes an operating point of the photo-modulator layer 25 to be varied compared with a case of no such leakage light.

R, G and B reading lights supplied to the spatial light modulator 20 (12) are different in light amount and wavelength spectrum from each other. Further, the photo-conductive layer 23 has a sensitivity response which is higher to a visible light of longer wavelength as shown in FIG. 4, when R, G and B lights input to the photo-conductive layer 23 are identical in light amount. Therefore, for the R light to which the photo-conductive layer 23 is highly sensitive or for large amount of light of any color, the photo-conductive layer 23 becomes more sensitive than to others, which causes operating point of the photo-conductive layer 23 to vary responsive to respective colored lights.

If the respectively colored images are projected onto a screen (not shown), it is impossible to obtain a normal white image nor properly color balanced image, causing contrast ratio of the image to be degraded or the projected image may have a reddish coloration, thus a desired, composed color image can not be obtained.

SUMMARY OF THE INVENTION

Accordingly, a general object of the present invention is to provide a display device in which the above disadvantages have been eliminated.

More specific object of the present invention is to provide a display device capable of obtaining a normally color balanced image.

Another and more specific object of the present invention is to provide a display device for displaying a color image on a screen comprising a light write-in type spatial light modulator including at least a photo-conductive layer and a dielectric mirror, writing devices for writing information time divisionally in a sequence of different colors onto the spatial light modulator, reading device for reading the information written on the spatial light modulator, by decomposing a light from a light source into the corresponding colors and directing them to the spatial light modulator in synchronism with the time-divisional writing of the information, a voltage supply device for supplying a driving voltage to the spatial light modulator, the voltage supply device changing a value of the driving voltage in synchronism with the time-divisional writing and a projecting device for projecting the information read out from the spatial light modulator through a projection lens onto the screen.

Further specific object of the present invention is to provide a display device for displaying a color image on a screen comprising a light write-in type spatial light modulator including at least a photo-conductive layer and a dielectric mirror, writing device for writing information time-divisionally in a sequence of different colors onto the spatial light modulator reading device for reading the information written on the spatial light modulator, by decomposing a light from a light source into the corresponding colors and directing them to the spatial light modulator in synchronism with the time-divisional writing of the information and a projecting device for projecting the information read out from the spatial light modulator through a projection lens onto the screen, wherein the dielectric mirror has a light absorbance characteristics such that influence of the plurality of colored lights on an impedance of the photo-conductive layer are substantially uniform.

Other objects and further features of the present invention will be apparent from the following detailed description.

DETAILED DESCRIPTION OF THE PREFERRED EMBODIMENT

An embodiment of a display device according to the present invention will be described with reference to the drawings, in which identical constructive components to those of the described conventional example are depicted by identical characters without detailed explanation thereof.

Figure 2:
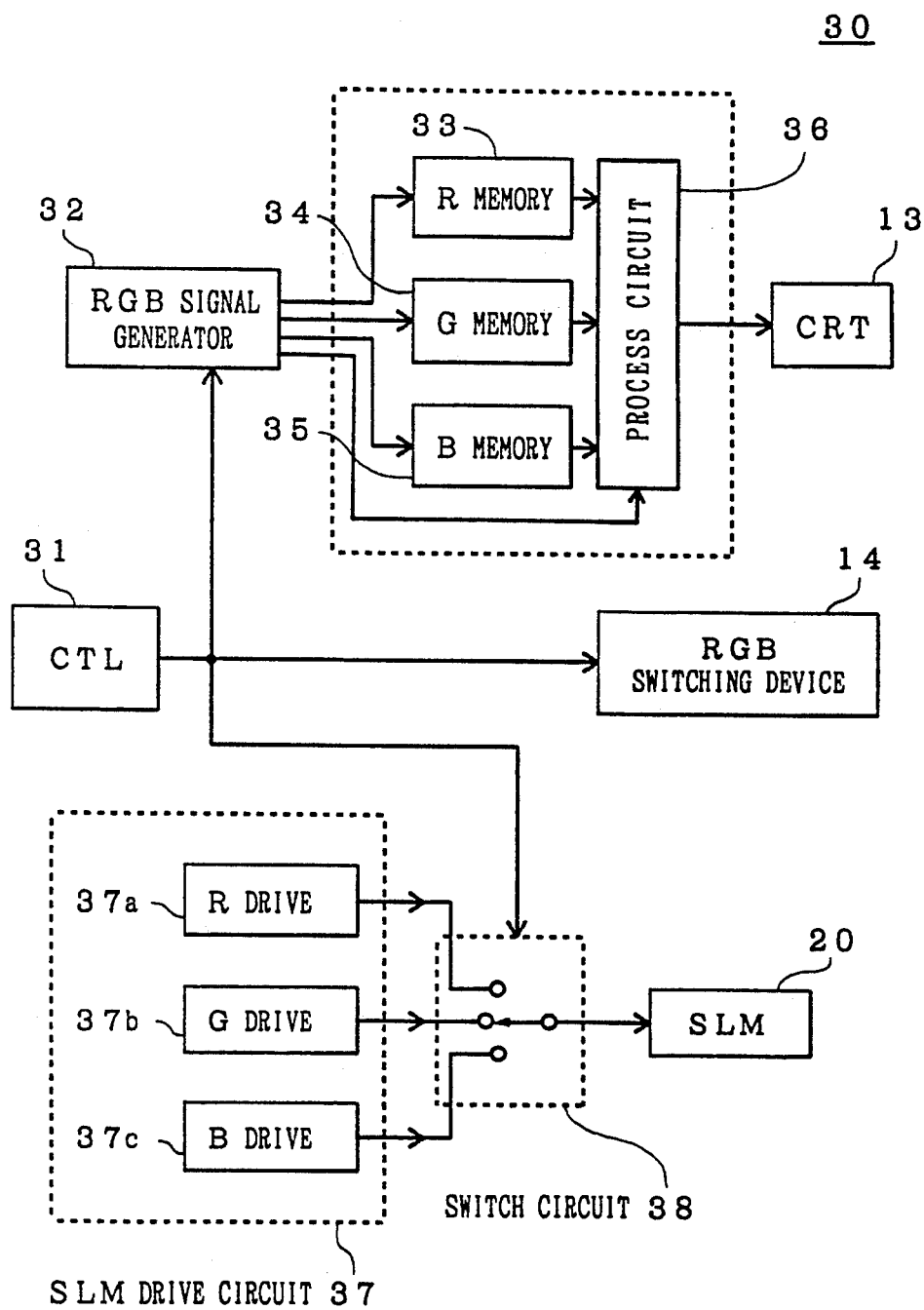
FIG. 2 is a block diagram showing an embodiment of a display device according to the present invention.

FIG. 2 is a block diagram of an embodiment of the display device 30 according to the present invention.

Figure 3:
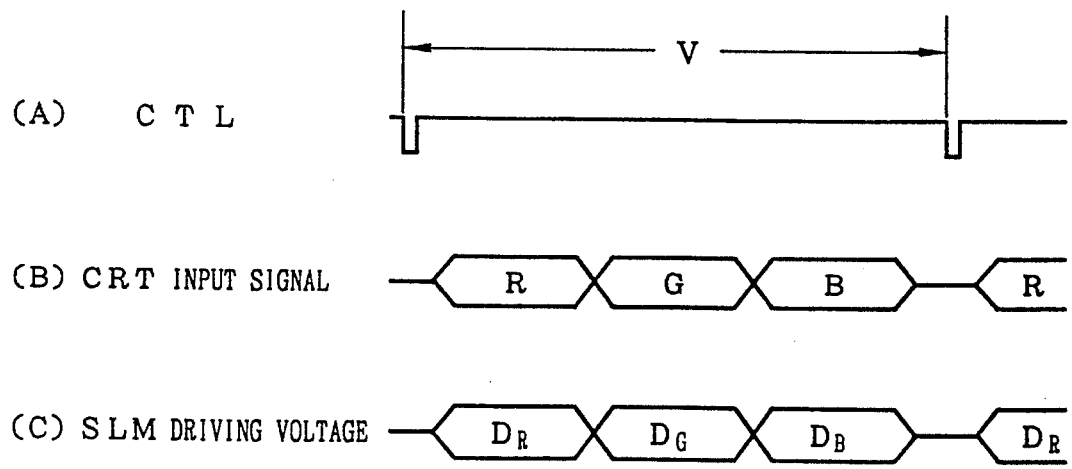
FIG. 3 shows a timing chart of various signals (A), (B) and (C)

FIG. 3 shows a timing chart of various signals (A), (B) and (C).

Figure 1:
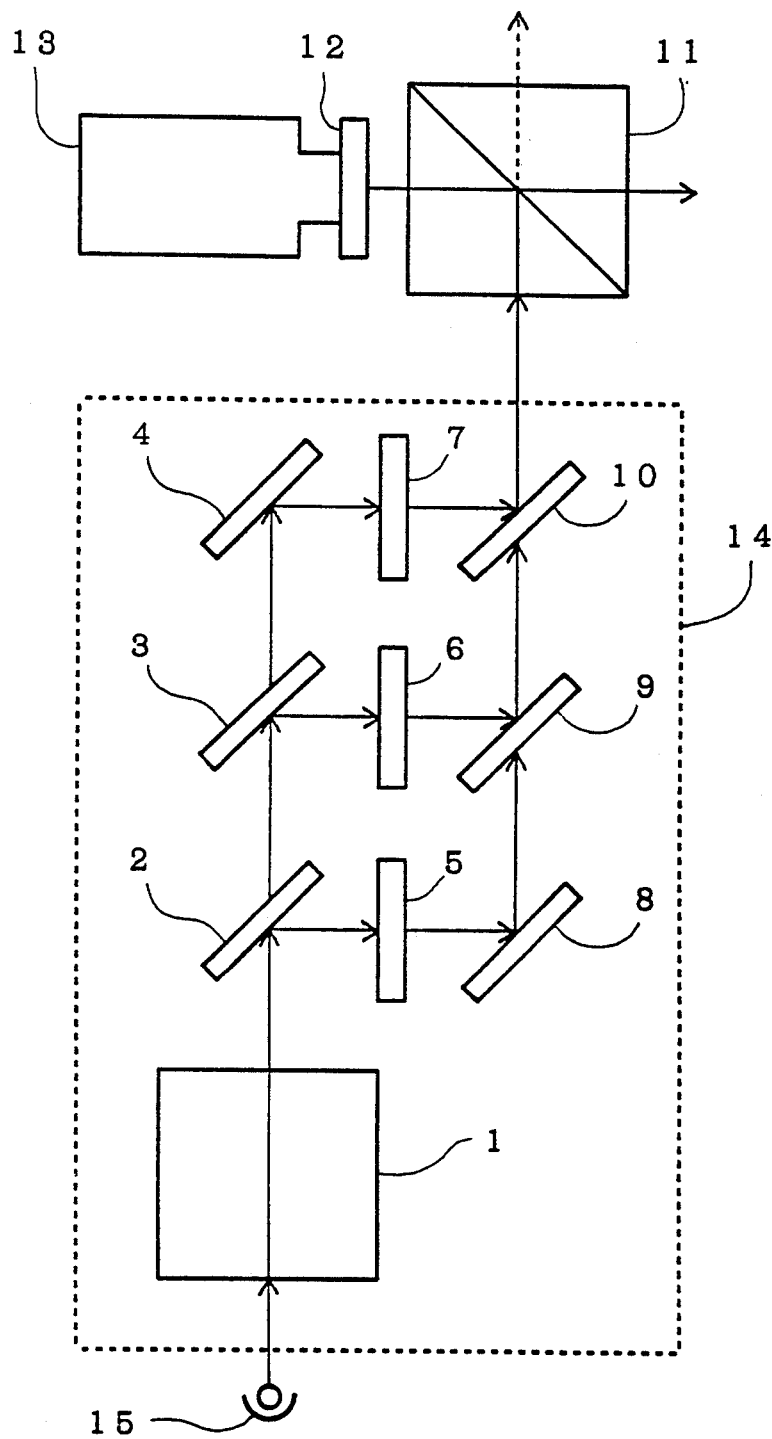
FIG. 1 shows a construction of an example of a conventional display device.

Referring to FIGS. 2 and 3, a control signal generator (CTL) 31 outputs a control signal for every frame (or field) as shown in FIG. 3(A). The control signal is supplied to an RGB signal generator 32, the RGB switching device 14 and a switch circuit 38. The RGB signal generator 32 responds to the control signal from the control signal generator 31 so as to compress RGB image signals by known technology and stores the compressed R, G and B image signals in an R memory 33, a G memory 34 and a B memory 35, respectively. Output signals from the R, G and B memories 33, 34 and 35 are supplied to a CRT 13 in a sequence of color image signals included within one frame by a processing circuit 36 as shown in FIG. 3(B) in such a manner that R, G, B color images sequentially displayed on the CRT 13 are exposed to a spatial light modulator (SLM) 20 as writing lights. It should be noted that the R, G, B color images need not have mutually different colors, but they may be monochrome images corresponding with the R, G, B image signals, respectively. The RGB switching device 14 responds to the control signal to operate in a similar manner to that previously described for the conventional display device with reference to FIG. 1, as such that it switches the reading lights of R, G and B generated from the white light so as to selectively supply the reading lights of R, G, and B to the spatial light modulator 20 correspondingly with and in synchronism with selective supply of the R, G and B signals to the CRT 13 by the processing circuit 36.

Figure 4:
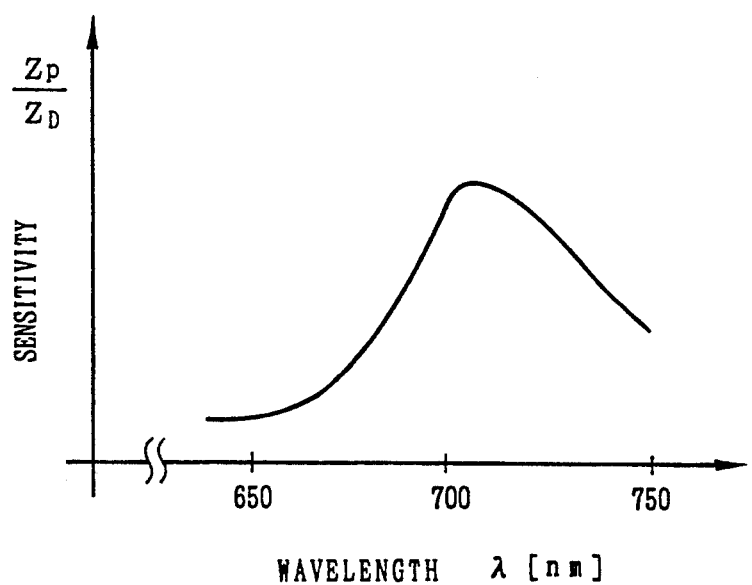
FIG. 4 is a graph showing a sensitivity characteristics of a photo-conductive layer for light.

An SLM drive circuit 37 is a circuit for supplying a drive (bias) voltage to the spatial light modulator 20 and is composed of an R drive circuit 37a operative when the R image is exposed to the spatial light modulator 20, a G drive circuit 37b operable when the G image is exposed to the spatial light modulator 20 and a B drive circuit 37c operable when the B image is exposed to the spatial light modulator 20. Through the switch circuit 38 controlled by the control signal from the CTL 31, the SLM drive circuit 37 selectively and sequentially supplies the spatial light modulator 20 with the drive voltages outputted from the drive circuit 37a, 37b and 37c in synchronism with the switching of the corresponding R, G, B color image signals to be supplied sequentially to the CRT 13 as shown in FIG. 3(C). A value and a frequency of the output drive voltage of the respective drive circuits 37a, 37b and 37c are established on the basis of sensitivity response of the photo-conductive layer 23 of the spatial light modulator 20 such as shown in FIG. 4, and of the wavelength of each reading light of different colors supplied to the spatial light modulator 20, and of an amount of each reading light leaked into the photo-conductive layer 23 so that the impedance of the photo-conductive layer 23, which impedance is dependent on the leaked amount of the respective R, G and B reading lights, becomes constant.

In other words, present invention utilizes a characteristic of the photo-conductive layer 23, which impedance i.e. the sensitivity changes in response to the applied driving voltage and frequency.

As a result, it is possible to obtain a normal white image and a desired properly color balanced image composed of the respective R, G and B lights read out from the spatial light modulator 20.

Figure 7:
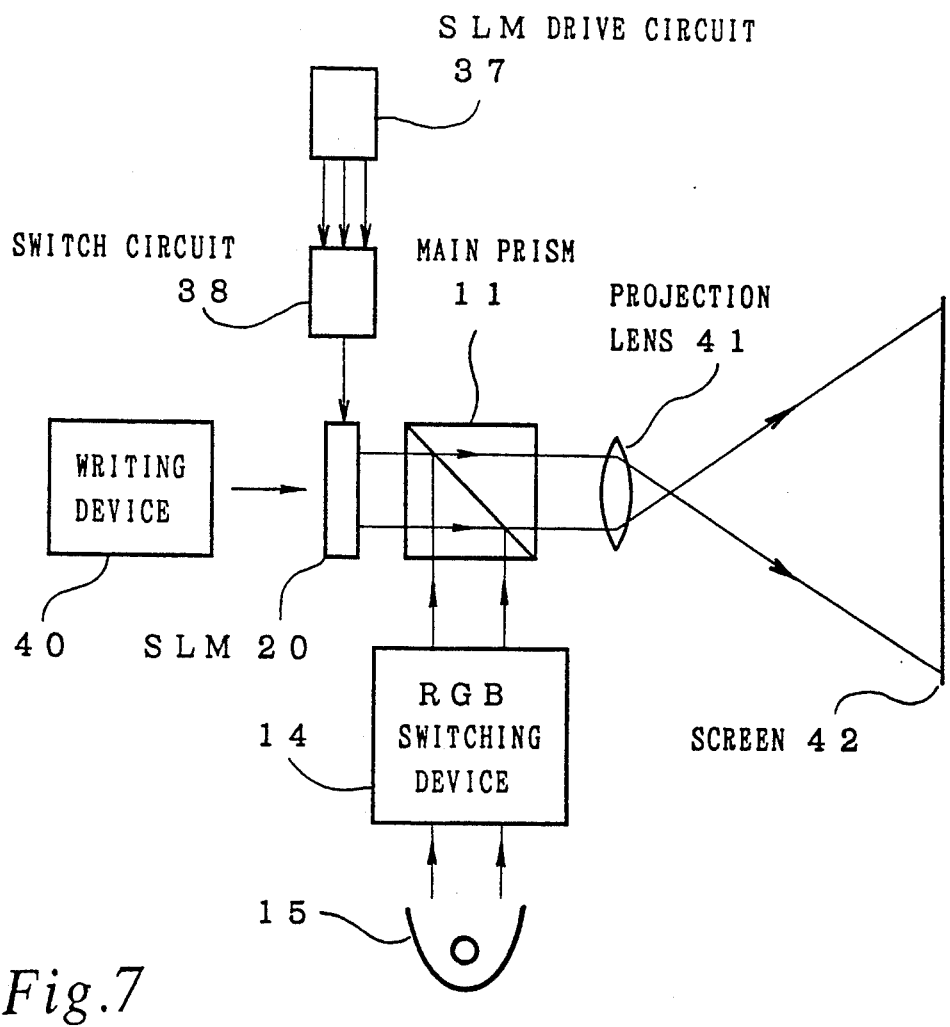
FIG. 7 shows an example of construction of a display device of the present invention.

FIG. 7 shows an example of the display device constructed according to the block circuit diagram shown in FIG. 2.

Referring to FIG. 7, the respective R, G and B writing lights from a writing device 40 (in this embodiment, it includes all components from the RGB signal generators 32 to the CRT 13) are supplied sequentially to the spatial light modulator 20. In synchronism with the switching of the R, G and B writing lights, the white light from the light source 15 is turned into the R, G and B reading lights by the RGB switching device 14, which reading lights are supplied to the main prism 11.

Simultaneously, the respective drive voltages from the SLM drive circuit 37 are switched in synchronism and correspondingly with the R, G and B reading lights by the switch circuit 38 to drive the spatial light modulator 20 respectively. Lights read out from the spatial light modulator 20 by using the R, G and B reading lights and the corresponding drive voltages are supplied to a projection lens 41 through the main prism 11 and projected on a screen 42, resulting in a normally color balanced color image thereon.

On the other hand, as a less effective but less complex alternative, it is possible to improve the projected image composed by using the R, G and B lights read out of the spatial light modulator 20, by controlling a light absorbance characteristic of the dielectric mirror 24 of the spatial light modulator 20, .

In this connection, the sensitivity characteristics of the photo-conductive layer 23 shown in FIG. 4 has a peak around the wavelength of 700 nm which coincides approximately with the wavelength of R light having the longest wavelength in the visible region.

Figure 5:
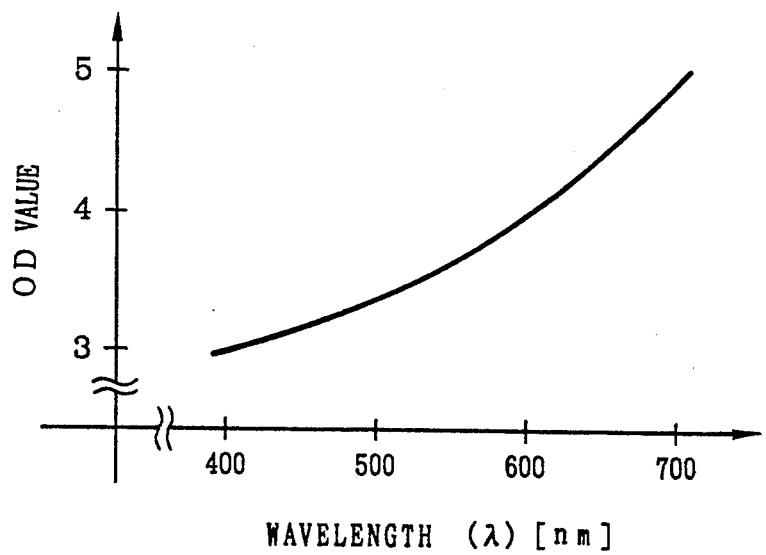
FIG. 5 is a graph showing a light absorbing characteristics of a dielectric mirror.
Figure 6:
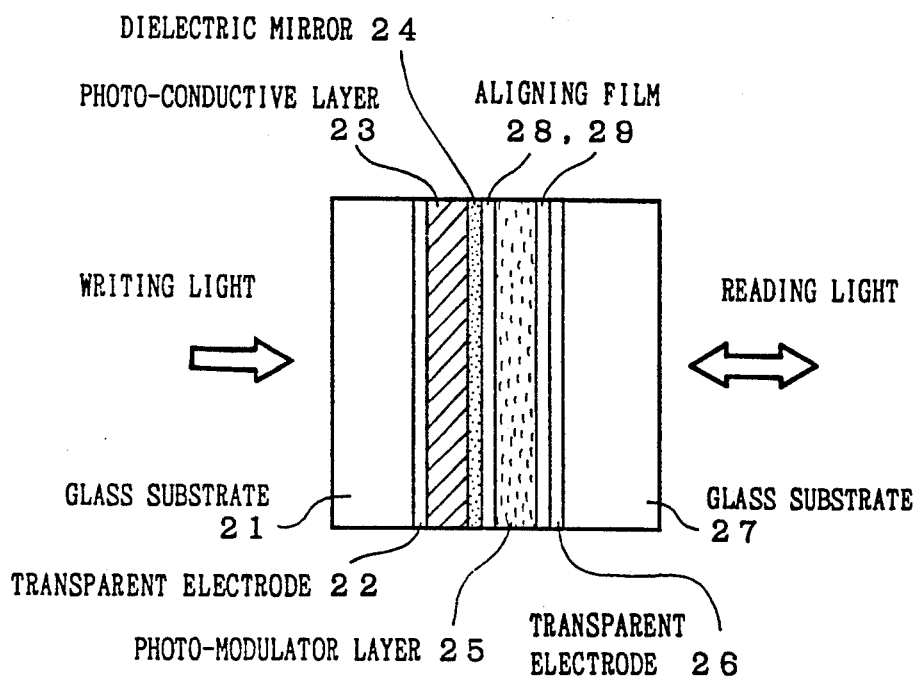
FIG. 6 is a sectional view showing a construction of an example of a spatial light modulator.

Utilizing this relationship, it is possible to make the impedance of the photo-conductive layer 23 fairly constant by controlling the light absorbance characteristics of the dielectric mirror 24 as such that a leakage of light having wavelength around 700 nm is more reduced than a light having a shorter wavelength. Since the light absorbance characteristic of the dielectric mirror 24 can be changed depending on a wavelength of light desired to be absorbed, the dielectric mirror 24 having such optical density (OD) gradient as a function of wavelength as shown in FIG. 5 (the longer the wavelength provides the larger the light absorbance, hence the smaller the leakage light), may be used in the spatial light modulator 20.

Accordingly, this type of spatial light modulator 20 with a dielectric mirror 24 having a light absorbance characteristic being controlled wavelength-selective to absorb the light to which the photo-conductive layer 23 is most sensitive, may be used with or without the previously explained method i.e. the control of the drive voltage of the spatial light modulator 20 concurrently with the switching of the R, G, and B lights. If used together, the improvements on the projected color image will be most effectively achieved.

In the past, a light blocking layer is sometimes provided additionally between the dielectric mirror 24 and the photo-conductive layer 23 in order to reduce an amount of leakage light to the photo-conductive layer 23. In such a case, a distance between the photo-conductive layer 23 and the dielectric mirror 24 increases necessarily, causing the resolution of the reading image to be degraded. According to the present invention, such problem is not present as no such additional light blocking layer is employed, instead, the dielectric mirror 24 having such OD value as shown in FIG. 5 in the spatial light modulator 20, is used for improved resolution.

Figure 8:
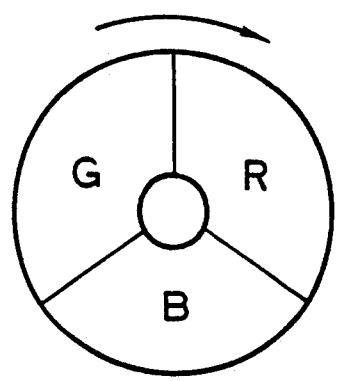
FIG. 8 shows a construction of an example of a filter.

Although, in the described embodiments, the R, G and B reading lights divided from the white light polarized by the polarizing prism are switched by the RGB switching device 14 composed of the filters and the liquid crystal polarizing switch, they can be switched by passing white light through a rotating R, G and B sectored filters 43 as shown in FIG. 8, the filter 43 is rotated in an arrow direction for obtaining sequentially the R, G and B reading lights.

Alternatively, the RGB switching device 14 may be constituted to produce other reading lights than R, G and B as reading lights with the signals driving the CRT 13 as well as the driving voltages and the frequencies all being modified correspondingly with the reading lights of other colors.

The display device of the present invention is constructed such that information represented by a plurality of colors is time-divisionally, in a sequence of different colors, written in a spatial light modulator, likewise a white reading light is decomposed time-divisionally, in a sequence of different colors, into a plurality of different color lights to be projected to the spatial light modulator for time-divisional reading in synchronism with the time-divisional writing, and a driving voltage or a driving frequency of the spatial light modulator is changed in synchronism with the time-divisional reading so that the spatial light modulator is driven with different driving voltages and/or different driving frequencies correspondingly with the amount and the wavelength of each color of the reading lights. Because of this, it is possible to obtain a high quality image having no particular coloration which may be projected on a screen.

Further or independent improvement is achieved by selecting the light absorbance characteristic of the dielectric mirror as such that the influence of reading lights of different colors on the photo-conductive layer becomes substantially uniform, so that undesired coloration and/or contrast ratio degradation is prevented with or without changing the driving voltage and/or the driving frequency of the spatial light modulator, resulting a clear white image or a desired composed color.

What is claimed is:

1. A display device for displaying color information comprising:
   a spatial light modulator including at least a photo-conductive layer, a photo-modulator layer and a dielectric mirror;
   writing means for writing optical information represented by different colors onto said spatial light modulator time-divisionally in a sequence of said different colors;
   reading means for producing reading lights having said different colors in synchronism with time-divisional writing of said optical information, and for projecting said reading lights to said spatial light modulator for reading said optical information written thereon;

driving means for supplying said spatial light modulator with different driving signals correspondingly with said reading lights having said different colors and in synchronism with time-divisional projections of said reading lights; and means for projecting said optical information read out from said spatial light modulator by said reading lights on display means for displaying said color information.

2. A display device as claimed in claim 1, wherein said different driving signals have different voltages from each other.

3. A display device as claimed in claim 1, wherein said different driving signals have different frequencies from each other.

4. A display device as claimed in claim 1, wherein said different driving signals have different voltages and frequencies from each other.

5. A display device for displaying color information comprising:

a spatial light modulator including at least a photo-conductive layer, a photo-modulator layer and a dielectric mirror, said dielectric mirror having a light absorbance characteristic controlled to be wavelength-selective to absorb a color of light to which said photo-conductive layer is most sensitive so that lights having different colors leaked into said photo-conductive layer through said dielectric mirror are controlled to cause a uniform impedance of said photo-conductive layer;

writing means for writing optical information represented by different colors onto said spatial light modulator time-divisionally in a sequence of said different colors;

reading means for producing reading lights having said different colors in synchronism with time-divisional writing of said optical information, and for projecting said reading lights to said spatial light modulator for reading said optical information written thereon;

means for projecting said optical information read out from said spatial light modulator by said reading lights on display means for displaying said color information.

* * * * *